United States Patent
Dotti-Sarda

(10) Patent No.: US 10,375,982 B2
(45) Date of Patent: Aug. 13, 2019

(54) EDIBLE LOW-SODIUM SALINE COMPOSITION

(71) Applicant: LANCASTER PLUS SLU, Barcelona (ES)

(72) Inventor: Josep Lluis Dotti-Sarda, Barcelona (ES)

( * ) Notice: Subject to any disclaimer, the term of this patent is extended or adjusted under 35 U.S.C. 154(b) by 43 days.

(21) Appl. No.: 15/550,803

(22) PCT Filed: Feb. 3, 2016

(86) PCT No.: PCT/ES2016/000012
§ 371 (c)(1),
(2) Date: Aug. 14, 2017

(87) PCT Pub. No.: WO2016/128589
PCT Pub. Date: Aug. 18, 2016

(65) Prior Publication Data
US 2018/0027857 A1    Feb. 1, 2018

(30) Foreign Application Priority Data

Feb. 12, 2015   (ES) .................................. 201530171

(51) Int. Cl.
| A23L 27/10 | (2016.01) |
| A23L 27/40 | (2016.01) |
| A23L 33/16 | (2016.01) |
| A23L 33/115 | (2016.01) |

(52) U.S. Cl.
CPC ............... *A23L 27/40* (2016.08); *A23L 27/10* (2016.08); *A23L 33/115* (2016.08); *A23L 33/16* (2016.08); *A23V 2002/00* (2013.01)

(58) Field of Classification Search
CPC ......... A23L 33/115; A23L 33/16; A23L 27/10
USPC .................................. 426/74, 649, 601, 629
See application file for complete search history.

(56) References Cited

U.S. PATENT DOCUMENTS

| 2,774,670 | A | * | 12/1956 | Albert |
| 6,013,300 | A | * | 1/2000 | Reichkitzer et al. |
| 7,803,418 | B2 | * | 9/2010 | Garter et al. |
| 2009/0047396 | A1 | * | 2/2009 | Ikeda |
| 2012/0164307 | A1 | * | 6/2012 | Wilkes |

* cited by examiner

*Primary Examiner* — Helen F Heggestad
(74) *Attorney, Agent, or Firm* — Eugenio J. Torres-Oyola; Victor M. Rodriguez-Reyes; Rafael Rodriguez-Reyes

(57) ABSTRACT

The composition comprises a mixture of: from 65% to 80% of rock salt; from 15% to 25% of a mixture of ground seeds selected from pumpkin, sunflower, sesame, flax and poppy; from 2% to 4% of linseed oil; and from 1% to 2% of a preservative for the oleaginous components; said percentages being in weight relative to the total weight of the mixture and the saline composition presenting a homogeneous grain size distribution.

20 Claims, No Drawings

EDIBLE LOW-SODIUM SALINE COMPOSITION

CROSS-REFERENCE TO RELATED APPLICATIONS

This application is the entry into national phase of International Application No. PCT/ES2016/000012 filed on Feb. 3, 2016, the content of which is hereby incorporated by reference in its entirety, which claims the benefit of Spanish Application No. P201530171 filed on Feb. 12, 2015, the content of which is hereby incorporated by reference in its entirety.

FIELD OF THE ART

The present invention relates to the enriched food products field. More particularly, it relates to an edible salt composition based on common salt or rock salt with low sodium content and which contains beneficial additives for human health, without detriment to the quality and safety characteristics of said food products.

In the context of the present descriptive specification, the term "enriched food products" refers to alimentary use products to which substances have been added that are not naturally contained or are contained in low concentrations.

STATE OF THE PRIOR ART

Common salt or rock salt, that is, sodium chloride, is a frequently used additive for preparing food and beverages, for domestic use for the seasoning of food and is also used in the food industry.

It is known that salt is beneficial for the human body. Consuming a certain amount of sodium ions and chloride ions is good for maintaining the saline balance of the human body, but the daily intake of sodium chloride is normally greater than the recommended maximum.

The excessive consumption of sodium can have very harmful consequences for health and it can particularly promote arterial hypertension. A diet with a high sodium intake reduces the nitric oxide level and, at the same time, increases the risk of suffering heart, vascular, kidney and brain diseases.

For many years, a demand has existed for the reduction of the amount of sodium present in food. The World Health Organisation recommends a maximum consumption of salt of 5 grams per day, when, according to data from AESAN (Agencia Española de Seguridad Alimentaria y Nutrición), almost double said amount is consumed. Ischemic heart disease constitutes one of the most important causes for death in the Western world.

To control sodium chloride intake, the use of different salt combinations has been proposed, in which other salts have been partially substituted for sodium chloride, among them potassium salts, ammonium salts, among others. However, the substitution of other chemical compounds for sodium chloride normally results in a worsening of taste and they are not usually perceived as pleasant by the consumer.

Therefore, it is necessary to find a substitute so that common salt has less sodium content, thereby avoiding the previously described issues.

Several examples are known of saline compositions with additives, as, for instance, the one described in patent ES 2100128"Procedimiento de producción de sales saborizadas y aromatizadas", by Luis Mariano Alcalde Diez, which claims a production procedure of salts with the addition of vegetable products for changing the taste and/or the aroma.

Another example of saline composition with additives is the U.S. Pat. No. 7,854,956 B2 "Low sodium salt compositions and method of preparations and uses thereof" by Juan Antonio Flores Zuñiga, which claims a low sodium salt composition of a mixture of sodium chloride and a double salt MgSO4.KSO4.H2O. It also claims an edible product according to the previous composition where an aromatic agent and/or dietary supplement are added.

Likewise, the patent application MX 2008003182 A "Composiciones con bajo contenido de sal de sodio y métodos de preparación y usos de éstas" by Juan Antonio Flores Zuñiga, claims compositions with low sodium content that contain a mixture of sodium chloride and one or more magnesium, sodium and potassium salts. Methods are also provided for preparing and using the compositions. In addition, alimentary products are provided that contain said compositions.

Another example of a saline composition with additives is described in the patent application MX 2008014553 A, "Sustituto para la sal común NaCl, su use y productos que la contiene" by Pascal Lejeune et al., which claims a substitute for common salt that at least comprises a yeast extract, flour of an aromatic nature and a low sodium content salt.

Other publications have also described the problem of excessive sodium and have proposed solutions for its resolution. Among said proposals, those combining low sodium content salts, in particular sodium chloride with lactose or dextrose (U.S. Pat. No. 3,860,732), fumaric acid (U.S. Pat. No. 3,505,082) or a mixture of magnesium chloride and magnesium sulphate (WO 98/55708) may be signaled out.

Therefore, the present invention relates to a new common salt composition with low sodium content (a 25% reduction), which combines additives that provide specific beneficial effects for human health.

SUMMARY OF THE INVENTION

The edible saline composition of the invention consists of a mixture of rock salt, a mixture of ground seeds and linseed oil. To this first mixture there can also be added a magnesium compound, or a calcium compound, or a mineral salt for the provisioning of trace elements, and a preservative for preventing oxidation of the linseed oil or of the oleaginous-derivative compounds of the seeds.

The proposed composition not only contains a significantly lower sodium amount than a common salt obtained by the addition of potassium chloride, but, in addition, it also contains agents beneficial for the prevention of cardiovascular diseases, aiding the proper operation of the muscular system and the nervous system and reduces fatigue; and it contributes to the upkeeping of bones, muscles and energy metabolism.

An edible saline composition suitable for seasoning, according to the present invention, comprises, according to a basic formulation, a mixture of:
  from 65% to 80% of rock salt;
  between 15% and 25% of a mixture of ground seeds selected from pumpkin, sunflower, sesame, flax and poppy;
  from 2% to 4% of linseed oil;
said weight percentages being with respect to the total weight of the mixture and the saline composition having homogeneous grain size distribution.

The composition is additionally characterized, in a particularly preferred embodiment, in that the referred rock salt comprises a 25% reduction in sodium, obtained through a greater proportion of potassium chloride that contributes to the proper operation of the nervous system and to the upkeeping of arterial tension.

Taking into account the presence in the composition of linseed oil and oleaginous products derived from said seed mixture, the addition of a preservative is contemplated functioning as an antioxidant of said oil and/or oleaginous products. The ratio of said preservative will be in the order from 1% to 2%, in detriment of the salt ratio until reaching 100% in weight of the composition.

DETAILED DESCRIPTION OF EXEMPLARY EMBODIMENTS

As has been indicated, the present invention provides an edible mixture of low sodium salt enriched with additives that provide beneficial effects for human health.

In a first exemplary embodiment, said low sodium edible salt mixture is characterized in that it comprises a mixture of 77% of low sodium content rock salt, 20% of a mixture of ground seeds selected from pumpkin, sunflower, natural sesame, golden flax, brown flax and poppy and 3% of linseed oil.

Through this composition, Omega 3 and Omega 6 acids (derived from the seed oil and from the linseed oil) are provided that contribute to heart health and the prevention of cardiovascular diseases.

In a second alternative example to the one previously described, the proposed saline composition comprises a mixture of 75% of rock salt, 20% of said seed mixture, 3% of linseed oil and 1% to 3%, preferably 2%, of a magnesium composition or magnesium inorganic salt, which can be magnesium chloride, oxide, sulphate or phosphate among other compounds that contain magnesium.

Through this composition, besides the health effects derived from the Omega 3 and Omega 6 acids, magnesium contributes to a good muscular function and to the operation of the nervous system, as well as a reduction in the feeling of fatigue.

According to a third exemplary embodiment, the proposed saline composition comprises a mixture of 70% of rock salt, 20% of said seed mixture, 3% of linseed oil and 5% to 10%, preferably 7%, of a calcium composition or inorganic calcium salt, which can be calcium chloride, oxide, sulphate or phosphate among other compounds that contain calcium.

This composition, besides the health effects derived from the Omega 3 and Omega 6 acids, contributes, thanks to said provisioning of calcium, to the upkeeping of bones, the muscles and the energy metabolism.

According to a preferred embodiment in all of the previous examples, said 20% of seed mixture is provided by specific concentrations that are approximately: 19.2% of pumpkin seeds, 19.2% of sunflower seeds, 19.2% of natural sesame seeds, 19.2% of golden flaxseeds, 19.2% of brown flaxseeds and 4% of poppy seeds.

Likewise, in all of the explained examples, the use of a preservative has been advantageously foreseen in a ratio of approximately 1% relative to the 3% of linseed oil for avoiding the oxidation of said linseed oil and of the oleaginous products derived from the seeds. By way of example, the use of a natural preservative based on tocopherol, rosemary oil and a small amount of food additive BHA (butylhydroxyanisole) is proposed. The very low ratio of said preservative in any of the mixtures previously described will be compensated for in detriment of the rest of components of the mixture until completing 100% in weight.

The proposed composition will be obtained by grinding said seeds with a grain size distribution according to the rock salt, and the mixture of the different components until reaching homogeneity.

What is claimed is:

1. A low sodium edible saline composition, suitable for seasoning, comprising a mixture of:
   from 65% to 80% of rock salt;
   between 15% and 25% of a mixture of ground seeds selected from pumpkin, sunflower, sesame, flax and poppy;
   from 2% to 4% of linseed oil;
   said percentages being in weight relative to the total weight of the mixture and the saline composition presenting homogeneous grain size distribution.

2. A composition according to claim 1, wherein said rock salt comprises a proportion of potassium chloride determining a 25% reduction in sodium content of the rock salt.

3. A composition according to claim 2, wherein said mixture of ground seeds comprises:
   19.2% of pumpkin seeds;
   19.2% of sunflower seeds;
   19.2% of natural sesame seeds;
   19.2% of golden flaxseeds;
   19.2% of brown flaxseeds; and
   4% of poppy seeds
   the collection of said components contributing, in the indicated ratio, said 15% to 25% of the saline composition.

4. A composition according to claim 2 or 3, comprising:
   77% of rock salt;
   20% of said seed mixture; and
   3% of the additional linseed oil.

5. A composition according to claim 2 or 3, further comprising at least 1% of a magnesium compound.

6. A composition according to claim 5, comprising:
   75% of rock salt;
   20% of said seed mixture;
   3% of the additional linseed oil; and
   2% of a magnesium compound.

7. A composition according to claim 5 or 6, wherein said magnesium compound is obtained from an inorganic salt that contains magnesium.

8. A composition according to claim 2 or 3, further comprising at least 5% of a calcium compound.

9. A composition according to claim 8, comprising:
   70% of rock salt;
   20% of said seed mixture;
   3% of said additional linseed oil; and
   7% of a calcium compound.

10. A composition according to claim 8 or 9, wherein said calcium compound is obtained from an inorganic salt that contains calcium.

11. A composition according to any of claims 1, 4, 6 and 9, further comprising the addition of a preservative for avoiding the oxidation of the additional linseed oil and of oleaginous products derived from the mixture seeds.

12. A composition according to claim 2 or 3, further comprising 2-7% of a mineral salt for the provisioning of trace elements selected from iron, phosphorus, fluorine, or iodine.

13. A composition according to claim 2, comprising:
   77% of rock salt;
   20% of said seed mixture; and
   3% of linseed oil.

14. A composition according to claim 2, further comprising at least 1% of a magnesium compound.

15. A composition according to claim 14, wherein said magnesium compound is obtained from an inorganic salt that contains magnesium.

16. A composition according to claim 14, comprising:
75% of rock salt;
20% of said seed mixture;
3% of linseed oil; and
2% of a magnesium compound.

17. A composition according to claim 2, further comprising at least 5% of a calcium compound.

18. A composition according to claim 17, wherein said calcium compound is obtained from an inorganic salt that contains calcium.

19. A composition according to claim 17, comprising:
70% of rock salt;
20% of said seed mixture;
3% of linseed oil; and
7% of a calcium compound.

20. A composition according to claim 2, further comprising 2-7% of a mineral salt for the provisioning of trace elements selected from iron, phosphorus, fluorine, or iodine.

* * * * *